(12) United States Patent  
Salgar et al.

(10) Patent No.: US 8,244,696 B2
(45) Date of Patent: Aug. 14, 2012

(54) METHODS AND SYSTEMS FOR SUPPORTING MULTIPLE DEPLOYMENT MODELS OF ENTERPRISE BUSINESS APPLICATIONS

(75) Inventors: Vivek Salgar, Cupertino, CA (US); John Joseph Jakubik, Austin, TX (US); Rajesh Raheja, Palo Alto, CA (US); Alan Fothergill, Half Moon Bay, CA (US); David Bowin, Atascadero, CA (US); George Colliat, Emerald Hills, CA (US); Kanchan Shringi, Redwood City, CA (US); Larry Harris, Belmont, CA (US); Michael Stillger, San Francisco, CA (US); Oliver Steinmeier, San Mateo, CA (US); Peter Moore, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1092 days.

(21) Appl. No.: 12/106,783

(22) Filed: Apr. 21, 2008

(65) Prior Publication Data

US 2009/0265683 A1 Oct. 22, 2009

(51) Int. Cl.
*G06F 7/00* (2006.01)
(52) U.S. Cl. .......... 707/695; 707/804; 717/174
(58) Field of Classification Search .......... None
See application file for complete search history.

(56) References Cited

U.S. PATENT DOCUMENTS

| | | | | |
|---|---|---|---|---|
| 6,418,448 | B1 * | 7/2002 | Sarkar | 1/1 |
| 2005/0125781 | A1 * | 6/2005 | Swamy et al. | 717/144 |
| 2005/0216503 | A1 * | 9/2005 | Charlot et al. | 707/103 R |
| 2006/0095705 | A1 * | 5/2006 | Wichelman et al. | 711/171 |
| 2006/0143239 | A1 * | 6/2006 | Battat et al. | 707/201 |
| 2006/0282482 | A1 * | 12/2006 | Castro et al. | 707/204 |
| 2008/0263503 | A1 * | 10/2008 | Polly et al. | 717/100 |
| 2008/0270973 | A1 * | 10/2008 | Edwards et al. | 717/104 |
| 2011/0004565 | A1 * | 1/2011 | Stephenson et al. | 705/348 |

* cited by examiner

*Primary Examiner* — Vei-Chung Liang
(74) *Attorney, Agent, or Firm* — Kilpatrick Townsend & Stockton LLP

(57) ABSTRACT

Methods and systems for supporting multiple deployment models for enterprise business applications, are described. In one embodiment, the method may include designating pillars associated with an enterprise business application. Each pillar may include application units which comprise logical groupings for application units used in the enterprise business application. The method may further include determining which of the application units are dependent to more than one of the pillars. Furthermore, based on the determination of the dependent application units, the method may generate deployment code associated with the dependent application units which is configured to be deployment model independent. The method may then receive, at deployment time, a deployment model designation indicating a type of deployment model selected to be used for the enterprise business application. Then, the enterprise business application may be deployed according to the deployment model designation.

20 Claims, 6 Drawing Sheets

Process of Building Multi-Pillar
deployable Software

METHODS AND SYSTEMS FOR SUPPORTING MULTIPLE DEPLOYMENT MODELS OF ENTERPRISE BUSINESS APPLICATIONS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to enterprise business applications, and more particularly, to dynamic selection of a deployment model for an enterprise business application.

BACKGROUND

Presently, when a customer purchases an enterprise business application unit to support their company's business process, the customer is required to select a deployment model. Some companies prefer a single instance database deployment model, while other companies prefer a multi-database model. In the single database deployment model all divisions or pillars of data are stored within a single database, whereas with the multi-database model each pillar of data is contained in its own database.

An application unit is a granular and well defined piece of software that performs a distinct function in supporting the implementation of a business application. Such an application unit can be clearly identified in software using software meta-data which entails the use of business data which is stored in a database. Furthermore, an application product is a set of application units configured to help perform a set of business functions to support a customer's business. These application products generally correspond to licensable products which a customer may purchase (e.g., a general ledger, accounts payable, benefits, sales, etc.).

A grouping of such application products for which a customer would typically like to deploy within a single instance database to support their business needs is referred to as a pillar. Examples of pillars include human capital management, customer relationship management, etc. Further, an enterprise business application suite consists of a grouping of the above mentioned pillars. Table 1 below is an example of the hierarchy described above.

While both deployment models have distinct advantages, some company's business models are more conducive to implementing either the single database model or the multi-database model but not both. Current solutions only support either the single database or the multi-database model. Thus, when selling enterprise software suites to a customer, the customer must determine which model the customer will need, and then the corresponding software is then sold to the customer. This can create a variety of problems such as, for example, the customer does not always know the model that will fit their business needs at the time of purchase, or the customer is mistaken as to which model to use and purchases the wrong model or may want to change the deployment configuration subsequent to initial deployment. Hence, there is a need for improved methods and systems in the art.

BRIEF SUMMARY

Embodiments of the present invention are directed to a method of supporting multiple deployment models for enterprise business applications. In one embodiment, the method may include designating pillars associated with an enterprise business application. Each pillar may include application products which comprise logical groupings for application products used in the enterprise business application. The method may further include determining which of the application units are dependent to more than one of the pillars.

Furthermore, based on the determination of the dependent application units, the method may create application code associated with the application units which is configured to be deployment model independent. The method may then receive, at deployment time, a deployment model designation indicating a type of deployment model selected to be used for the enterprise business application. Then, the enterprise business application may be deployed according to the deployment model designation.

According to further embodiments, a system to present configuration options associated with an enterprise business application, is described. The system may include at least one database which is configured to store all pillars in a suite or at most one database per pillar. In a further embodiment, the application units may be configured to determine which of the application units are dependent to more than one pillar. There may be two software patterns used in the development of application units.

The first type may be software interfaces within an application unit which may rely on data which is local to the database (e.g., an Entity Object (EO) in an Oracle™ Application Development Framework (ADF) Business Component (BC) techstack). Hence, if the data required by the appli-

TABLE 1

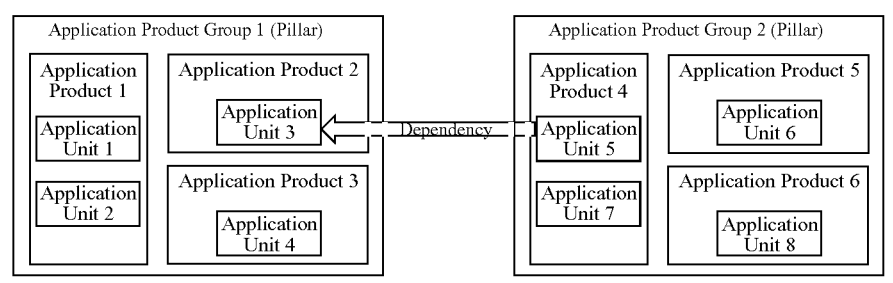

cation unit is remote, then data replication is needed in order to bring the data to the local database so the interface provided by the EO will work for both deployment models.

The second type of software interfaces may be a service interface. With the service interface the pillar deployment configuration may decide if the data is local or if it is remote. The application unit may then receive, at deployment time, a deployment model designation indicating a type of deployment model selected to be used for the enterprise business application, and whether to source the data locally or remotely. If the data is remote then the software will access the network to the remote database in order to retrieve the data. The decision to select the type of software implementation is typically based on performance requirements of the application since retrieving remote data is almost always slower than retrieving it locally.

In an alternative embodiment, a machine-readable medium is described. The machine-readable medium may be configured to support multiple deployment models for enterprise business applications. In one embodiment, the machine-readable medium may include designating pillars associated with an enterprise business application. Each pillar may include application products which comprise logical groupings for application products used in the enterprise business application. The machine-readable medium may further include determining which of the application products are dependent to more than one of the pillars.

Furthermore, based on the determination of the dependent application units, the machine-readable medium may generate deployment code associated with the dependent application products which is configured to be deployment model independent. The machine-readable medium may then receive, at deployment time, a deployment model designation indicating a type of deployment model selected to be used for the enterprise business application. Then, the enterprise business application may be deployed according to the deployment model designation.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention involve dynamic deployment of enterprise business applications. Typically two models for implementing enterprise business applications are used. One model used in a single instance database model and the other is a multi-instance database model. Depending on a customer's business needs, either model may be appropriate. Therefore, embodiments of the present invention allow a customer to dynamically, at deployment time, select either model for deploying their enterprise business application.

Figure 1:
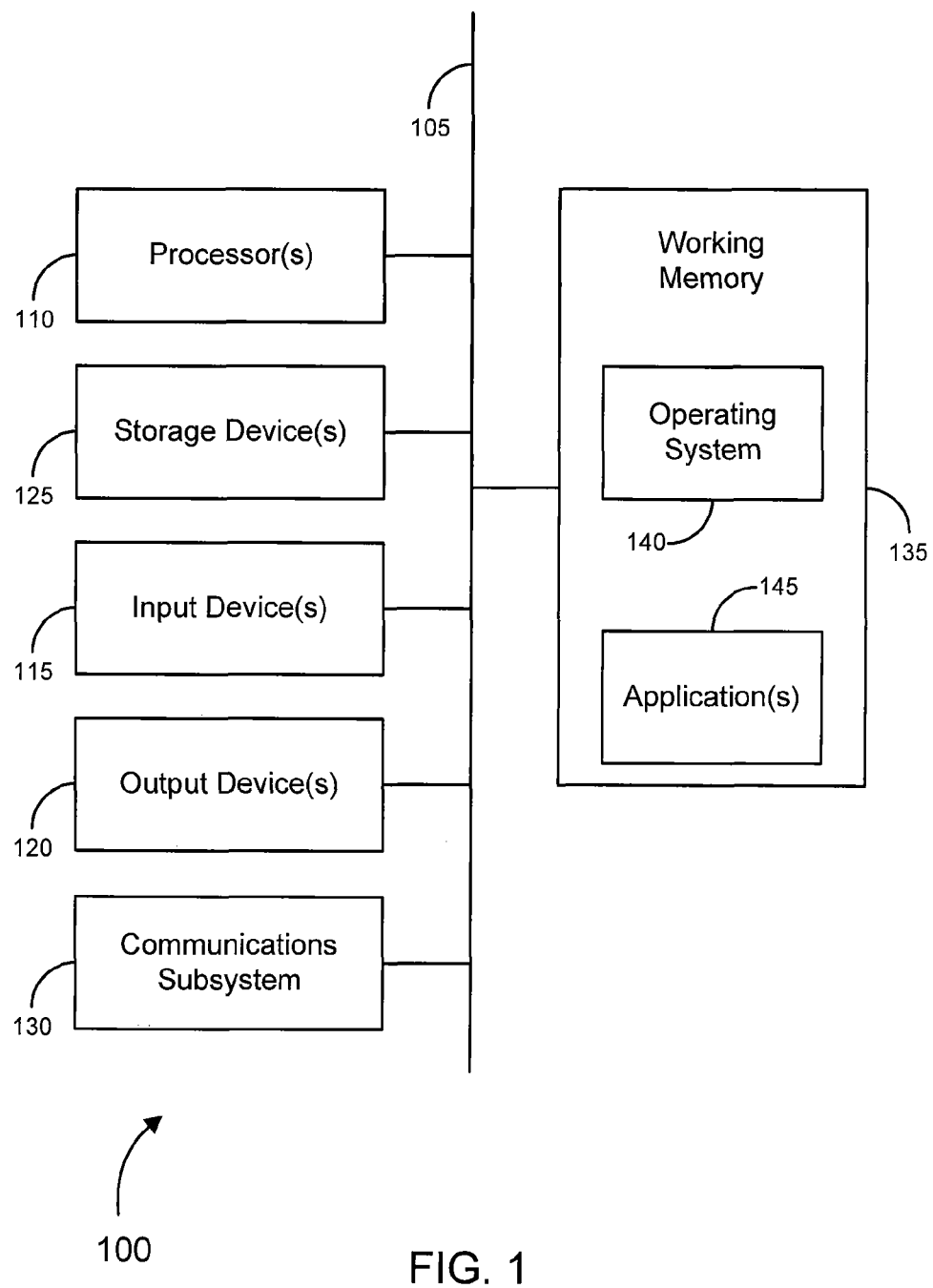
FIG. 1 is a generalized schematic diagram illustrating a computer system, in accordance with various embodiments of the invention.
Figure 5:
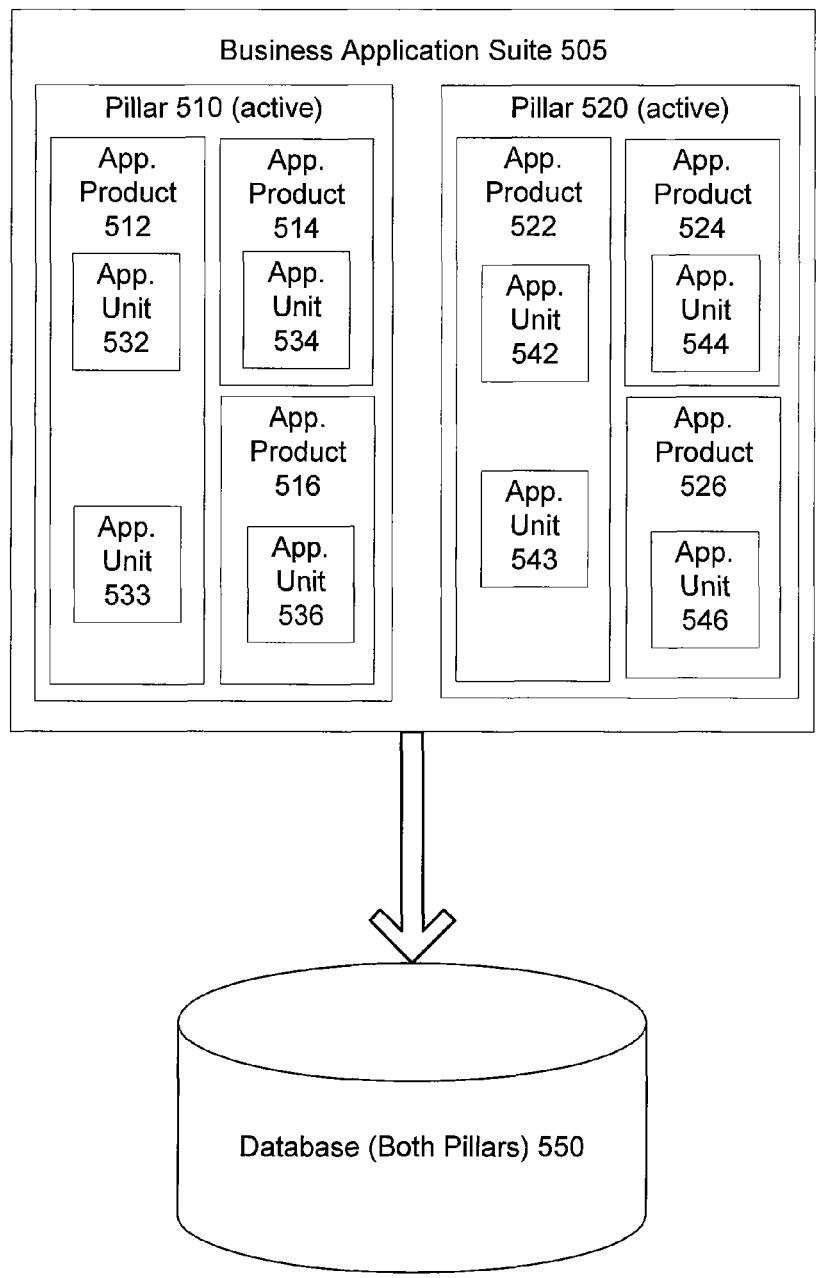
FIG. 5 is a diagram illustrating the process in which an Enterprise Business Application Suite may be configured to run with a single database for all pillars, in accordance with various embodiments of the invention.

FIG. 1 provides a schematic illustration of one embodiment of a computer system 100 that can perform the methods of the invention, as described herein, and/or can function, for example, as any part of enterprise business application unit 505 from FIG. 5. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation one or more general-purpose processors and/or one or more special-purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 100 might also include a communications subsystem 130, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 100, various machine-readable media might be involved in providing instructions/code to processor(s) 110 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation dynamic memory, such as the working memory 135. Transmission media includes coaxial cables, copper wire and fiber optics, including the wires that comprise the bus 105, as well as the various components of the communication subsystem 130 (and/or the media by which the communications subsystem 130 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 105 retrieves and executes the instructions. The instructions received by the working memory 135 may optionally be stored on a storage device 125 either before or after execution by the processor(s) 110.

Figure 2:
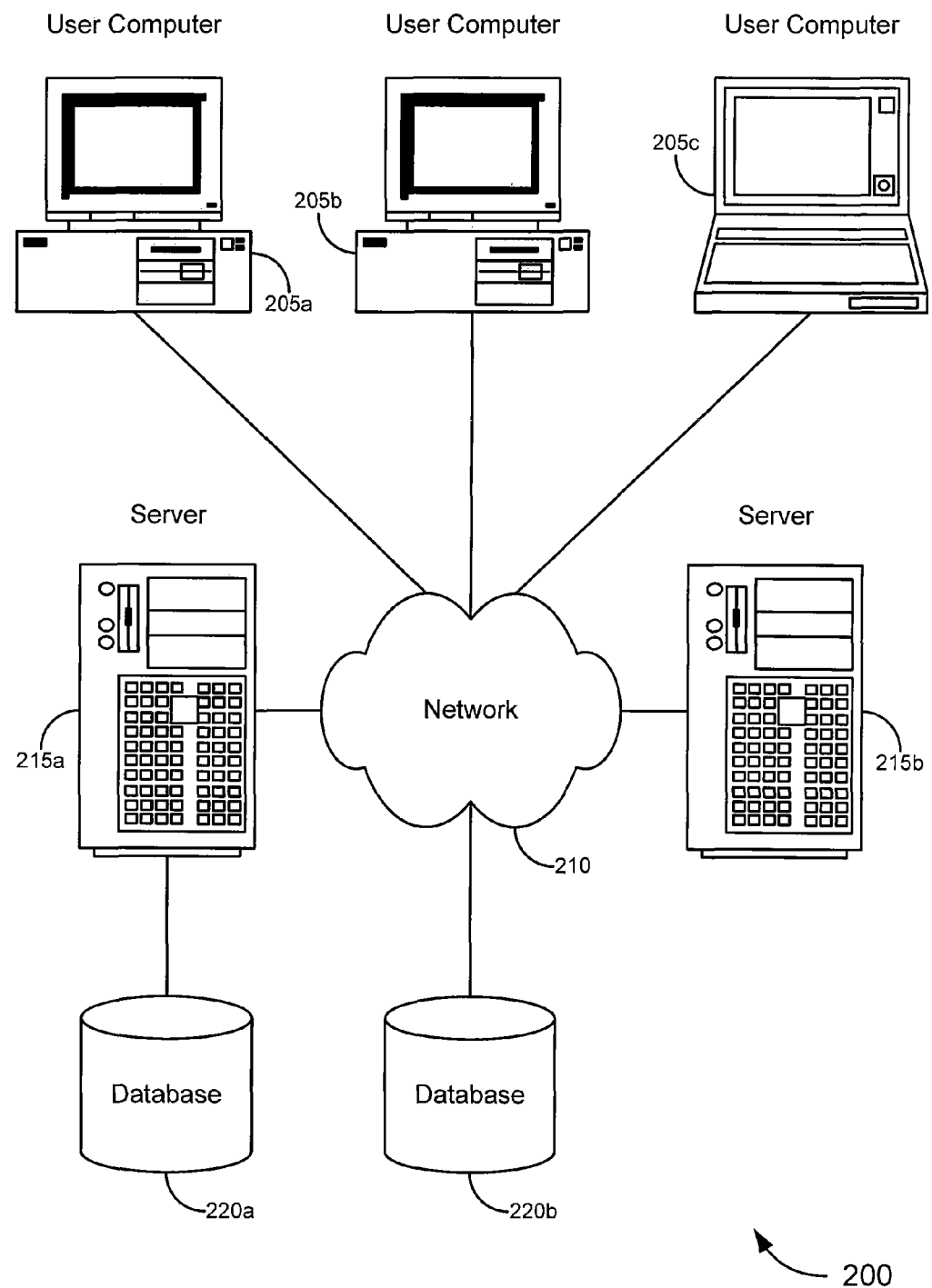
FIG. 2 is a block diagram illustrating a networked system of computers, which can be used in accordance with various embodiments of the invention.

A set of embodiments comprises systems for supporting multiple deployment models for enterprise business applications. In one embodiment, user computers 205 and/or servers 215 may be implemented as computer system 100 in FIG. 1. Merely by way of example, FIG. 2 illustrates a schematic diagram of a system 200 that can be used in accordance with one set of embodiments. The system 200 can include one or more user computers 205a, 205b, or 205c. The user computers 205a, 205b, or 205c can be general purpose personal computers (including, merely by way of example, personal computers and/or laptop computers running any appropriate flavor of MICROSOFT CORP.'s WINDOWS and/or APPLE CORP.'s MACINTOSH operating systems) and/or workstation computers running any of a variety of commercially-available UNIX™ or UNIX-like operating systems. These user computers 205a, 205b, or 205c can also have any of a variety of applications, including one or more applications configured to perform methods of the invention, as well as one or more office applications, database client and/or server applications, and web browser applications. Alternatively, the user computers 205a, 205b, or 205c can be any other electronic device, such as a thin-client computer, Internet-enabled mobile telephone, and/or personal digital assistant (PDA), capable of communicating via a network (e.g., the network 210 described below) and/or displaying and navigating web pages or other types of electronic documents. Although the exemplary system 200 is shown with three user computers 205a, 205b, or 205c, any number of user computers can be supported.

Certain embodiments of the invention operate in a networked environment, which can include a network 210. The network 210 can be any type of network familiar to those skilled in the art that can support data communications using any of a variety of commercially-available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more user computers 205a, 205b, or 205c and/or other servers 215.

Merely by way of example, one of the servers 215 may be a web server, which can be used, merely by way of example, to process requests for web pages or other electronic documents from user computers 205a, 205b, or 205c. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205a, 205b, or 205c to perform methods of the invention.

The server computers 215, in some embodiments, might include one or more application servers, which can include one or more applications accessible by a client running on one or more of the user computers 205a, 205b, or 205c and/or other servers 215. Merely by way of example, the server(s) 215 can be one or more general purpose computers capable of executing programs or scripts in response to the user computers 205a, 205b, or 205c and/or other servers 215, including without limitation web applications (which might, in some cases, be configured to perform methods of the invention). Merely by way of example, a web application can be implemented as one or more scripts or programs written in any suitable programming language, such as JAVA, C, C#™ or C++, and/or any scripting language, such as PERL, PYTHON, or TCL, as well as combinations of any programming/scripting languages. The application server(s) can also include database servers, including without limitation those commercially available from ORACLE, MICROSOFT, SYBASE, IBM™ and the like, which can process requests from clients (including, depending on the configuration, database clients, API clients, web browsers, etc.) running on one of user computers 205a, 205b, or 205c and/or another server 215. In some embodiments, an application server can create web pages dynamically for displaying the information in accordance with embodiments of the invention, such as a web interface. Data provided by an application server may be formatted as web pages (comprising HTML, JAVASCRIPT, etc., for example) and/or may be forwarded to one or more of user computers 205a, 205b, or 205c via a web server (as described above, for example). Similarly, a web server might receive web page requests and/or input data from one or more of user computers 205a, 205b, or 205c and/or forward the web page requests and/or input data to an application server. In some cases a web server may be integrated with an application server.

In accordance with further embodiments, one or more servers 215 can function as a file server and/or can include one or more of the files (e.g., application code, data files, etc.) necessary to implement methods of the invention incorporated by an application running on one or more of user computers 205 and/or another server 215. Alternatively, as those skilled in the art will appreciate, a file server can include all necessary files, allowing such an application to be invoked remotely by one or more of user computers 205 and/or server 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 220. The location of the database(s) 220 is discretionary: merely by way of example, a database 220a might reside on a storage medium local to (and/or resident in) a server 215a (and/or one or more of user computers 205a, 205b, or 205c). Alternatively, a database 220b can be remote from any or all of the computers 205, 215, so long as the database can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205a, 205b, or 205c, 215 can be stored locally on the respective computer and/or remotely, as appropriate.) In one set of embodiments, the database 220 can be a relational database, such as an Oracle™ database, that is adapted to store, update, and retrieve data in response to SQL-formatted commands. The database might be controlled and/or maintained by a database server, as described above, for example.

Figure 3:
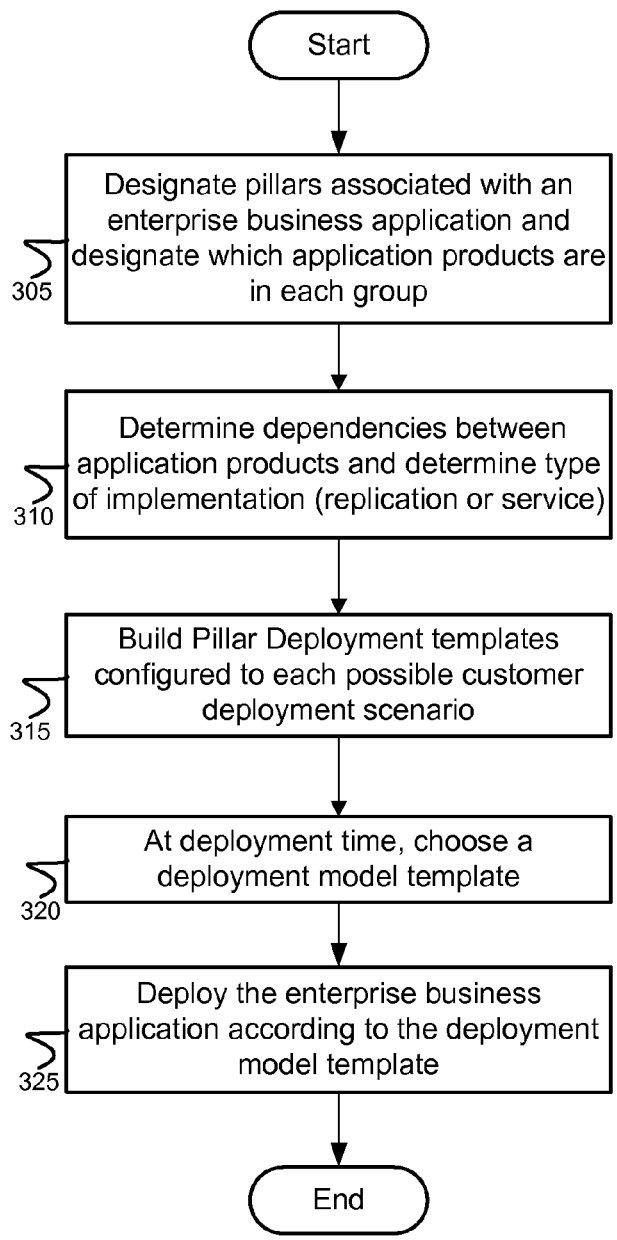
FIG. 3 is a flow diagram illustrating the process to go through to create a business application to support multiple deployment models for enterprise business applications, in accordance with various embodiments of the invention.
Figure 4:
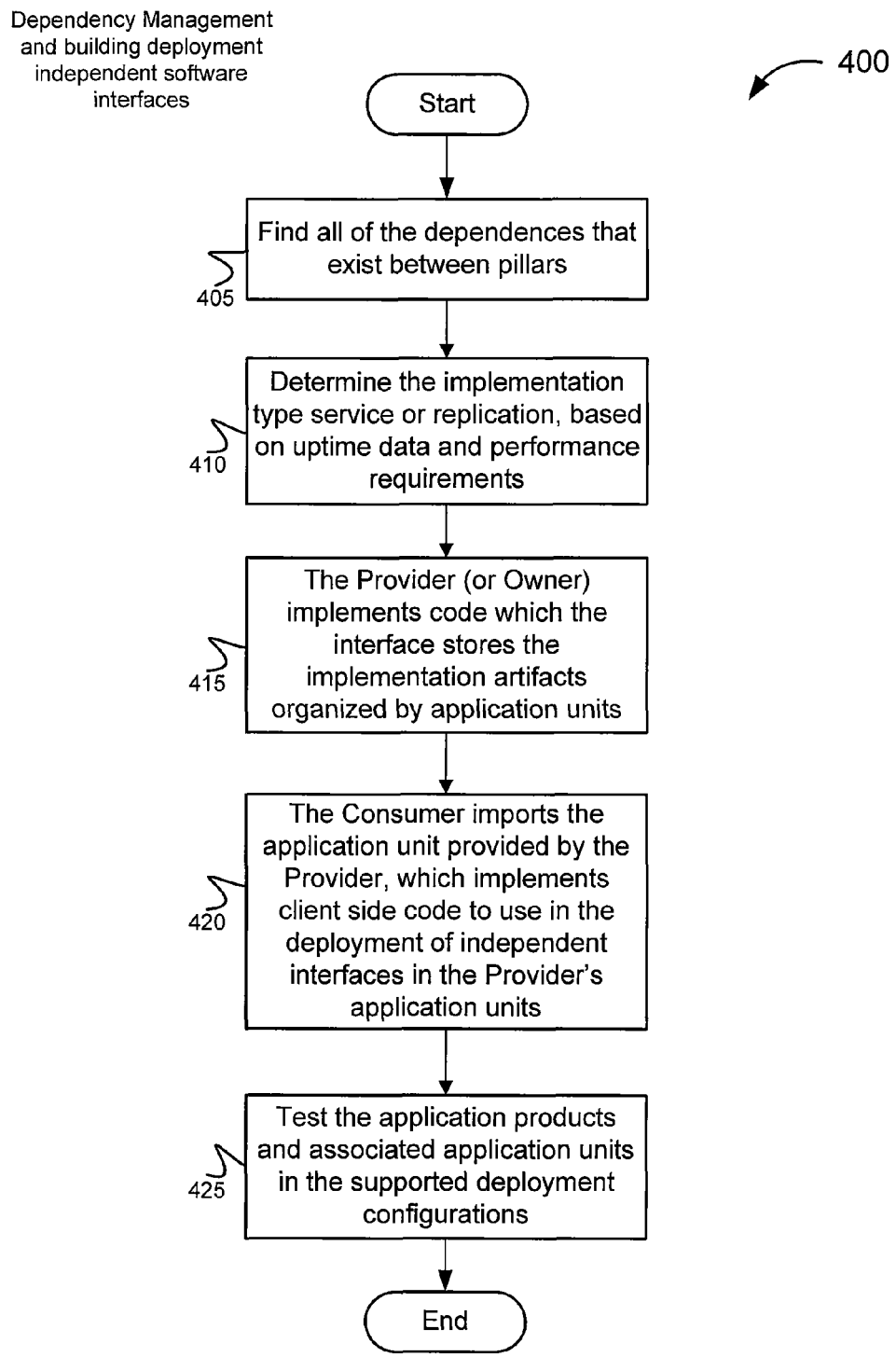
FIG. 4 is a flow diagram illustrating a more detailed embodiment of Step 310 in FIG. 3 further illustrating the process of dependency management, where each dependency has a particular software interface implementation based on uptime and performance requirements.

In one embodiment, database 220 may be a used in a single database model or a multi-database model implemented in method 300 and method 400 in FIGS. 3 and 4. Furthermore, database 220 may be implemented as database 510 or databases 550 in FIG. 5. Turning now to FIG. 3 which illustrates method 300 for supporting multiple deployment models for enterprise business applications. At process block 305, pillar (or pillars) may be designated. These pillars may be associated with an enterprise business application.

In one embodiment, these pillars are logical groupings of application products. Merely by way of example, where a customer's business deals in automotive parts, one pillar may be Supply Chain Management, another pillar may be Customer Relationship Management, and yet another pillar may be Human Capital Management. Additional and/or alternative pillars may be used, as well as alternative business types.

In one embodiment, method 300 allows for the customer to completely configure the pillars associated with their enterprise business application to best suit their area of business.

At process block 310, a determination may be made as to the dependencies of products within the designated pillars. For example, one application product may be Core HR while another application product may be Expenses. In this situation there is a dependency between the Expenses product and the Core HR product (see FIG. 4 below for a more detailed description of how such dependencies may be handled).

In a further embodiment, the determination of dependencies across pillar boundaries may be made by executing a code analysis with the code associated with the pillar. For example, any instance where a particular software interface within an application unit is leveraged by more than one pillar, it is determined that the application unit is dependent to more than one pillar and is required for that pillar to operate. Each pillar may access the objects within the application unit in a different way. For example, one pillar may only read the application product data, while another pillar may read and/or write to the application product data.

In one embodiment, the application product data as well as the pillar data may be stored using either a single instance database model or a multi-instance database model. With the single instance model, all of the pillars are stored in a single database. Conversely, with the multi-instance model, each pillar is stored in its own separate database. In one embodiment, an optimization as to whether to store in a single database or a separate database is that for a single database the database schema is the same. As such, this eliminates the need for copying data within the same instance in the single database deployment. Therefore, in order to accommodate for either model, the code which references these dependent application units may need to be configured to work with both deployment models (i.e., deployment model independent code) (process block 315). In one embodiment, this deployment model independent code may be implemented using a single line of code.

At process block 320, at the time of deployment of the enterprise business application, the customer may be presented with a variety of customization options. Some options may include selection of the pillars, selection of replication criteria (e.g., the system of record for a business object), etc. Furthermore, because the deployment code is deployment model independent, the customer is able, at deployment time, to choose either the single database model or the multi-database model. Accordingly, the implementation of the enterprise business application is completely dynamic which allows the customer to fully customize the application. After the customer has designated the deployment model and other options, the enterprise business application may then be deployed accordingly (process block 325).

In a further embodiment, when data is replicated it may be important to determine which database is designated as the system of record. The data in the system of record may be considered a source of truth if/when there is any inconsistency of data across database instances. In the case of replication, when a dependency is resolved by replicating data the interface may assume local pillar access of data irrespective of the system of record for that data being in a local or remote database instance. Furthermore, another reason to replicate the data is to ensure that the business application functionality can be performed locally, and not be stopped because the remote instance is not available. Hence, replication can contribute to the uptime requirements.

In another embodiment, when choosing to implement APIs as a remotable service by using a services interface we can optimize the APIs based on pillar deployment. The service uses an optimized access-pattern through the local route for single database deployments, but uses the remote route for multi-database deployments. Accordingly, this optimization can be enabled and used on runtime deployment configurations.

Referring now to FIG. 4, which illustrates method 400 for determining whether to use data replication or a remotable service. At process block 405, it is determined whether any portion of the data associated with the various pillars can be stored at a remote location in, for example, a multi-database implementation (i.e., find all of the dependencies that exist between the pillars). In some instances there may be a decrease in efficiency if data is located remotely (e.g., an increase in bandwidth consumption, transport time delays, etc.). However, in other situations it may be more efficient for the data to remain remotely located. For example, if the data that is remotely located is too large (e.g., over 100 MB), it may not be efficient to transfer the remotely located data across a network. As such, data can be accessed both remotely and locally when creating the pillars.

Nonetheless, if it is determined that portions of the data associated with the pillars is remotely located and that it is efficient to transfer the data, the portions may then be replicated such that all of the data for a given pillar is stored in the same location. Subsequently, as discussed above, the pillars may be analyzed to determine product dependencies across the groups. At process block 410, an implementation of using a service or replication may be determined based on uptime and/or performance requirements. In a further embodiment, based on the analyzed dependencies, an output file (e.g., a spreadsheet, a text file, etc.) which includes a list of the determined dependencies may be generated.

At process block 415, a Provider (or Owner) may implement code which the interface can then store the implementation artifacts which are organized by application units. The Consumer may then import the application unit provided by the Provider. The Provider may implement client-side code to use in the deployment of independent interfaces in the Provider's application units (process block 420). Furthermore, based on determined product data dependencies, deployment code may be generated to accommodate for such dependencies. Accordingly, at deployment time the customer may select either the single instance database model or the multi-instance database model. At process block 425, the application products and associated application units may be tested in all of the supported deployment configurations.

Turning now to FIG. 5, which illustrates a system for demonstrating the process in which an business application suite 505 may be configured to run with a single database 550 (i.e., single database model) for all pillars (e.g., pillars 510 and 520). In one embodiment, database 550 may be configured to store product application data. Business Application Suite 505 may include a pillar 510 which may include application products 512, 514, and 516. Each application product may include one or more application units. For example, application product 512 includes application units 532 and 533, whereas application product 514 only include application unit 534 and application product 516 only includes application unit 532.

Business application suite 505 may further include a pillar 520. Pillar 520 may similarly include application products 522, 524, and 526. Application product 522 may include application units 542 and 543, application product 524 includes application unit 544, and application product 526 may include application unit 546. It should be noted that pillars 510 and 520 may include any number of application products and each application product may include any number of application units. The current configuration in FIG. 5 is merely for exemplary purposes. Both pillars 510 and 520 are set to an "active" status, thus FIG. 5 demonstrates deploying a single instance (i.e., business application suite 505) for all active pillars (i.e., pillars 510 and 520).

Figure 6:
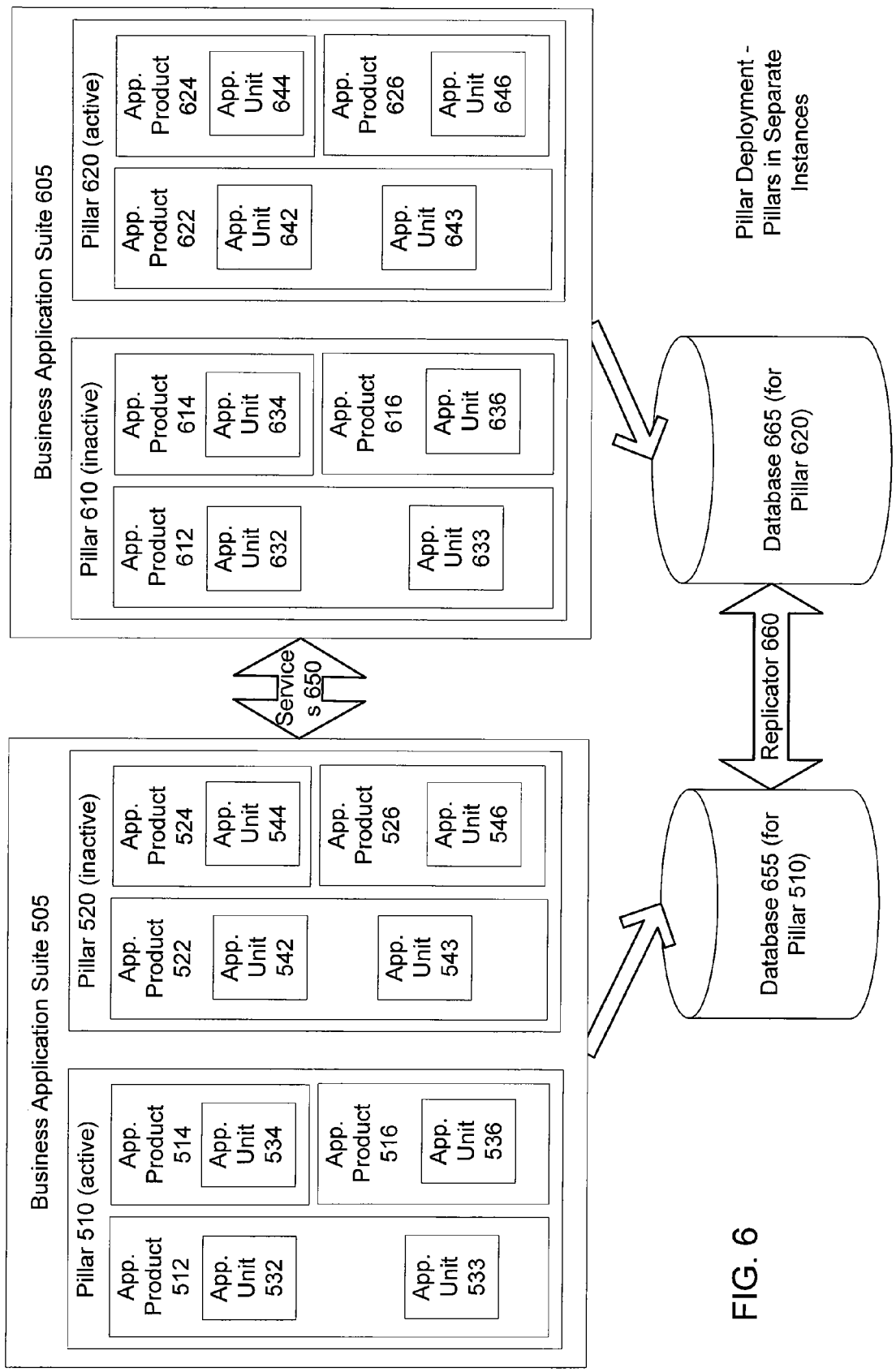
FIG. 6 is a diagram illustrating the process in which the same code has been deployed in two instances with two databases and is configured to run Pillar A in one instance and Pillar B in another instance, in accordance with various embodiments of the invention.

FIG. 6 is a diagram illustrating the process in which the same code has been deployed in two instances with two databases (i.e., databases 655 and 665) and is configured to run pillar 510 in one instance (i.e., business application suite 505) and pillar 620 in another instance (i.e., business application suite 605). As such, FIG. 6 demonstrates a multi-database model. Furthermore, since in this example pillars 520 and 610 are inactive, only pillars 510 and 620 are run. In one embodiment, pillar 610 may include application products 612, 614, and 616. In a further embodiment, application product 612 may include application units 632 and 633, application product 614 may include application unit 634, and application product 616 may include application product 636. In yet another embodiment, pillar 620 may include application products 622, 624, and 626. Furthermore, application product 622 may include application units 642 and 643, application product 624 may include application unit 644, and application product 626 may include application product 646.

In one embodiment, business application suites 505 and 605 may be coupled together via services 650. In addition, databases 655 and 665 may be coupled together via replicator 660. In one embodiment, services 650 facilitate communication between business application suites 505 and 605, while replicator 660 is configured to determine changes to databases 655 and 665, as well as replicate the changed portion of the data to other pillars. Accordingly, as shown in FIGS. 5 and 6, both a multi-database model and a single database model, as well as local and remote database implementations for enterprise business applications may be implemented.

In a further embodiment, an enabler may be the administration of the pillar configuration artifacts at implementation time and runtime so they have contextual information about what is replicated versus what is service enabled. This can make it possible for runtime administration of the system, and provides the capability diagnosing errors and recovery mechanisms.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A computer implemented method of supporting multiple deployment models for enterprise business applications, the method comprising:
    designating pillars associated with an enterprise business application, each of the pillars including application units, wherein the pillars comprise logical groupings for the application units to be used in an enterprise business application;
    utilizing a single database schema which is used for each deployment model, wherein the single database schema allows for an optimized implementation by having each of the pillars running within a single database instance;
    determining which of the application units are dependent to more than one of the pillars;
    based on uptime data and performance requirements of the pillars, determining which replication interface and service interfaces to use to resolve the dependencies;
    based on the determinations, generating deployment code associated with the dependent application units which is configured to be deployment model independent;
    receiving, at deployment time, a deployment model designation indicating the deployment model selected to be used for the enterprise business application;
    building pillar deployment model templates configured to each possible customer deployment scenario, wherein each possible customer deployment scenario includes a single instance database model or multi-instance database model;
    at deployment time, choosing one of the deployment model templates; and
    based on the chosen deployment model template, deploying the enterprise business application according to the designated deployment model using the generated deployment code.

2. The method of claim 1, wherein data local to each pillar is stored in a single database.

3. The method of claim 2, wherein the deployment model comprises one of a single database implementation or a multiple database implementation configured to store data which is local to each of the pillars.

4. The method of claim 3, wherein the multiple database implementation deployment model comprises an individual database for each of the pillars.

5. The method of claim 3, wherein the single database implementation deployment model comprises a single database for all of the pillars.

6. The method of claim 2, wherein the deployment model comprises one of a remote database implementation or a local database implementation.

7. The method of claim 2, wherein the generated deployment code comprises a single code line for both the single database implementation and the multiple database implementation.

8. The method of claim 2, further comprising providing a service interface to access data associated with the deployed enterprise business application.

9. The method of claim 8, wherein the service interface is configured to allow for switching between local or remote access to the data, and to provide for an optimized path for local access.

10. The method of claim 1, further comprising:
determining whether a portion of the data associated with the pillars is stored at a remote location; and
in response to the determination that a portion of the data is stored at a remote location, replicating the portion of the data in order to store all of the data at a single location.

11. The method of claim 1, further comprising generating, at deployment time, deployment code configured to support the selected deployment model.

12. The method of claim 11, wherein configuration options include one or more of selection of pillars, selection of deployment model, and selection of a replication criteria.

13. The method of claim 1, further comprising providing a configuration tool to provide configuration options associated with the enterprise business application.

14. The method of claim 1, wherein the determining of which of the application units are dependent to more than one of the pillars comprises running an analysis of the pillars to identify application unit dependencies.

15. The method of claim 1, further comprising generating an output file including a list of the dependent application units.

16. A system for supporting multiple deployment models for enterprise business applications, the system comprising:
a storage medium; and
a processor in communication with the storage medium, wherein the storage medium has sets of instructions storage therein which, when executed by the processor, cause the processor to implement:
an interface configured to present configuration options associated with an enterprise business application;
at least one database configured to store at least two pillars, wherein each pillar includes application units, wherein at least one pillar comprises logical groupings for the application units used in the enterprise business application; and
an application unit coupled to the interface and the at least one database, the application unit configured to, based on uptime data and performance requirements of the pillars, determine which of the application units are dependent to more than one of the pillars, to generate deployment code associated with the dependent application units which is configured to be deployment model independent, to receive, at deployment time, a deployment model designation from the interface indicating a deployment model designated to be used for the enterprise business application, build pillar deployment model templates configured to each possible customer deployment scenario, wherein each possible customer deployment scenario includes a single instance database model or multi-instance database model, at deployment time, choose one of the deployment model templates, based on the chosen deployment model template, deploy the enterprise business application according to the deployment model designation using the generated deployment code, and to provide a mechanism for administration of pillar configuration artifacts at implementation time and runtime.

17. The system of claim 16, further comprising a replication tool configured to determine changes to the at least one database, and to replicate that portion of the data to other pillars.

18. The system of claim 16, wherein the generated deployment code comprises a single code line for both a single database implementation and a multiple database implementation.

19. A non-transitory machine-readable medium for supporting multiple deployment models for enterprise business applications, having sets of instructions stored thereon which, when executed by a machine, cause the machine to:
designate pillars associated with an enterprise business application, each of the pillars including application units, wherein the pillars comprise logical groupings for the application units to be used in an enterprise business application;
based on uptime data and performance requirements of the pillars, determine which of the application units are dependent to more than one of the pillars;
based on the determination of the dependent application units and type of application unit, generate deployment code associated with the dependent application units which is configured to be deployment model independent;
receive, at deployment time, a deployment model designation indicating the deployment model selected to be used for the enterprise business application; and
build pillar deployment model templates configured to each possible customer deployment scenario, wherein each possible customer deployment scenario includes a single instance database model or multi-instance database model;
at deployment time, choose one of the deployment model templates; and
based on the chosen deployment model template, deploy the enterprise business application according to the designated deployment model using the generated deployment code.

20. The non-transitory machine-readable medium of claim 19, wherein the sets of instructions which, when further executed by the machine, cause the machine to:
determine whether a portion of the data associated with the pillars is stored at a remote location; and
in response to the determination that a portion of the data is stored at a remote location, replicate the portion of the data in order to store all of the data at a single location.

* * * * *

UNITED STATES PATENT AND TRADEMARK OFFICE
CERTIFICATE OF CORRECTION

| | | |
|---|---|---|
| PATENT NO. | : 8,244,696 B2 | Page 1 of 1 |
| APPLICATION NO. | : 12/106783 | |
| DATED | : August 14, 2012 | |
| INVENTOR(S) | : Salgar et al. | |

It is certified that error appears in the above-identified patent and that said Letters Patent is hereby corrected as shown below:

On sheet 4 of 6, Reference Numeral 405, in figure 4, line 1, delete "dependences" and insert -- dependencies --, therefor.

In column 5, line 31, delete "and or" and insert -- and/or --, therefor.

Signed and Sealed this
Sixth Day of November, 2012

David J. Kappos
*Director of the United States Patent and Trademark Office*